Aug. 17, 1965 D. W. MOYER ETAL 3,200,830
FLOW DIVIDER VALVE
Filed Jan. 16, 1963
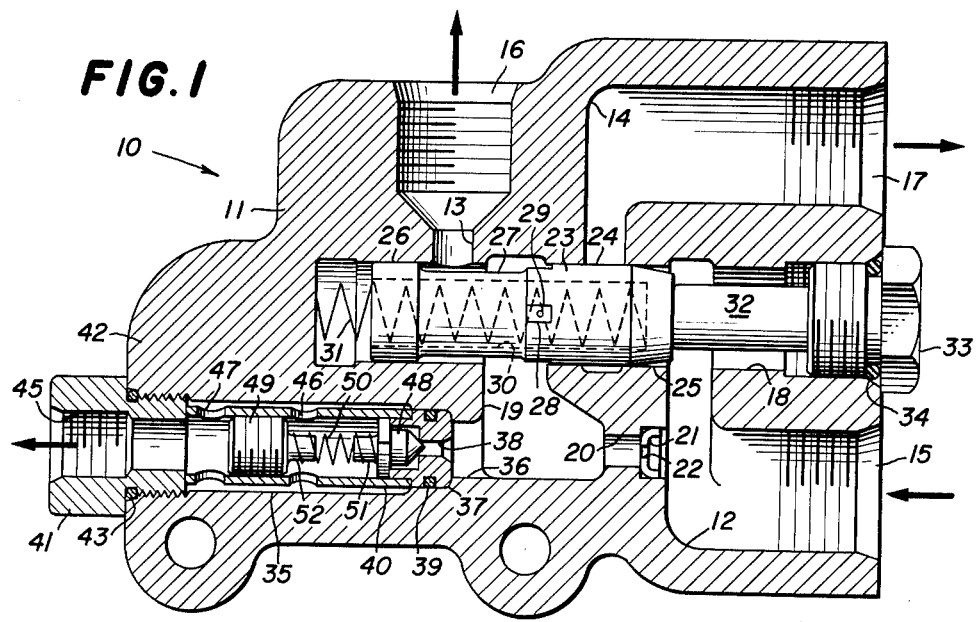
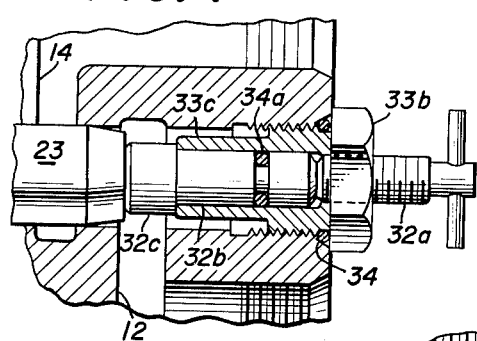
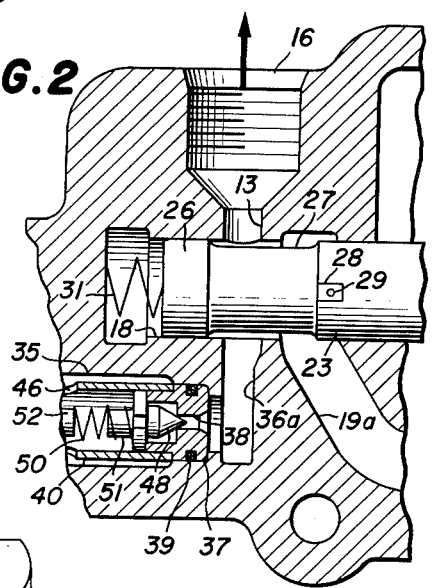
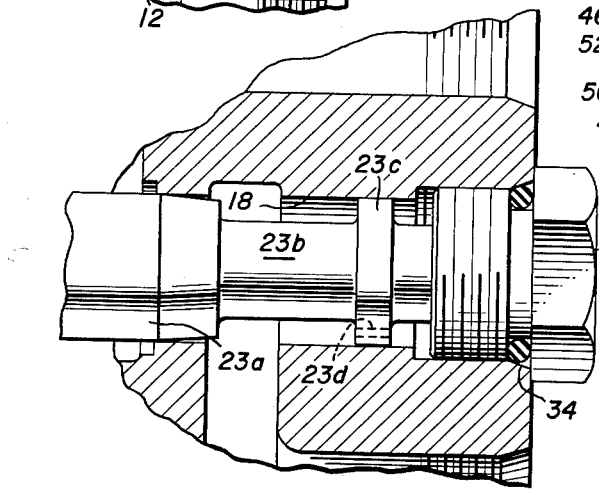
INVENTORS
DONALD W. MOYER
JOHN S. LAM
BY
ATTY.

United States Patent Office 3,200,830
Patented Aug. 17, 1965

3,200,830
FLOW DIVIDER VALVE
Donald W. Moyer, Chicago, and John S. Lam, Clarendon Hills, Ill., assignors to International Harvester Company, Chicago, Ill., a corporation of New Jersey
Filed Jan. 16, 1963, Ser. No. 251,930
6 Claims. (Cl. 137—101)

This invention relates generally to fluid pressure systems, and more particularly to fluid pressure responsive priority valves which are operative to provide divided flow for a plurality of fluid systems. This is a continuation-in-part of our copending application 214,590, filed August 3, 1962, now abandoned.

On automatic agricultural and industrial-type vehicles it is often desirable and indeed necessary to employ a plurality of fluid pressure systems for operating a plurality of associated devices. Rather than incorporating separate fluid pressure systems for each such device, it is modern practice to incorporate a single fluid pressure system and to operate all of the necessary hydraulic devices from one system. Often it is required to specifically control a particular system, such as for example to provide a constant flow rate to a power steering system. In this event, it becomes necessary to provide means by which priority is given to the fluid available for this system while making additional fluid available for the operation of secondary and auxiliary systems.

An object of this invention is to provide fluid flow control means which operates to direct fluid from a single fluid pressure source under a specific predetermined condition to a primary fluid operated device and, additionally, to direct fluid in excess of the requirements of said primary device to one or more secondary fluid operated devices.

Another object of this invention is to provide a fluid operated flow divider valve which provides fluid at a substantially constant rate of flow for a primary circuit and provides fluid in excess of the requirements of said primary circuit for one or more secondary circuits.

Another object of this invention is to provide a fluid operated flow divider valve which will provide a substantially constant rate of flow to a priority circuit regardless of fluctuations or surges in the supply of fluid to said valve and which operates to provide fluid in excess of the requirements of said primary circuit for the operation of secondary circuits.

Another object of this invention is to provide fluid pressure operated spool-type flow divider valve which will direct fluid from a source of pressure to a primary circuit at a substantially constant rate of flow, which valve is provided with means for compensating for fluctuations, variations, and surges in the flow from said source and which will direct excess fluid flow for the operation of one or more secondary circuits.

Another object of this invention is to provide a fluid operated flow divider valve having means for relieving high pressures developed during cold weather starting.

Another object of this invention is in the provision of a flow divider valve which will direct fluid from a source of fluid under pressure to a plurality of output circuits in accordance with the demands of said circuits.

Another object of this invention is the provision of a flow divider valve of simple design and easily manufactured nature.

These and other objects of the invention will become apparent to one skilled in the art from the following specification and drawings, in which:

FIGURE 1 is a sectional view showing one form of the flow controller;

FIGURE 2 is a fragmentary sectional view showing a modification of the flow controller;

FIGURE 3 is a fragmentary sectional view showing another modification of the flow controller; and FIGURE 4 is a fragmentary sectional view showing still another modification of the flow controller.

Referring now to the drawings, FIGURE 1 shows generally the flow divider 10, which includes a housing 11. Formed within the housing 11 are inlet passage 12 and primary and secondary outlet passages 13 and 14 respectively. Passages 12, 13 and 14 are provided with threaded fittings 15, 16 and 17 respectively. Within housing 11 is formed a valve bore 18 transverse to passages 12, 13 and 14. Bore 18 is also transverse to a chamber 19 which communicates through a passage 20 with inlet passage 12. Passage 20 is provided with a suitable annular fitting 21 in an enlarged portion thereof, which annular fitting defines a flow orifice 22.

Slidably received within bore 18 is a valve spool 23. Valve spool 23 is formed with an enlarged land 24 having a taper 25 at one end thereof and a smaller land 26 at the other end thereof. Intermediate lands 24 and 26 is a stem portion 27 of smaller diameter than lands 24 and 26. The surface of land 24 is provided with a plurality of flat portions 28 extending from the engagement surface of land 24 with stem portion 27. A flow orifice 29 extends from each flat portion 28 through valve spool 23 to communicate with an inner counterbore 30 formed within valve spool 23. A suitable biasing spring 31 engages valve spool 23 within counterbore 30 and reacts against housing 11 at one end of bore 18 to provide a biasing force for valve spool 23.

A valve stop member 32 extends inwardly into valve bore 18 from one end of a plug 33 which is threadedly or otherwise suitably secured to seal valve bore 18. A suitable O-ring 34 insures the prevention of leakage about the plug 33.

An enlarged bore 35 is formed to extend inwardly from one surface of housing 11 and communicate through a passage 36 with chamber 19. A valve seat member 37 forming a flow passage 38 is seated intermediate passages 35 and 36 and is provided with suitable O-ring packing means 39. Extending from valve seat 37 into passage 35 is the cylindrical valve support element 40. A suitable fitting 41 is threaded or otherwise suitably secured at 42 to the housing 11 against an O-ring 43. Fitting 41 engages cylindrical element 40 to insure a tight fit of the entire assembly. Fitting 41 is provided with an outlet passage 44 communicating with the interior of cylindrical element 40 and with threaded outlet 45.

Cylindrical element 40 is provided with a plurality of flow passages 46 and 47. A valve element 48 is slidably received within cylindrical element 40 and adapted to seat against valve seat member 37 to block flow through passage 38. Intermediate flow openings 46 and 47 a stop member 49 is threadedly received in cylindrical element 40. Biasing spring 50 extends from spring guides 51 and 52 formed on valve element 48 and stop member 49 respectively and serves to bias valve element 48 toward valve seat member 37. The position of stop member 49 determines the compression in spring 50 and thus the biasing force acting on valve element 48.

In operation a source of fluid under pressure is attached at fitting 15 to inlet passage 12. The primary outlet 13 is connected through suitable fittings at 16 with the primary fluid-operated device which must be closely controlled. The auxiliary fluid-operated device or devices are connected at 17 to secondary outlet passage 14. A return line is connected at 45 leading to reservoir.

Valve spool 23 normally rests against valve stop member 32 under the influence of biasing spring 31. Communication between inlet passage 12 and secondary outlet passage 14 is blocked and fluid entering inlet passage 12 passes through pressure reducing orifice 22, passage 20 and chamber 19 and then around valve stem 27 and out through primary outlet passage 13. Some fluid also passes through orifices 29 into counterbore 30 and acts against the left hand end of valve spool 23 as shown in FIGURE 1 to support the force of spring 31 acting on valve spool 23. Full inlet pressure acts on the right hand end of valve spool 23 as shown in FIGURE 1 in opposition to the force of biasing spring 31 and the fluid supporting the biasing spring.

So long as input pressure remains low the condition outlined will obtain and all of the available fluid will flow to the primary outlet 13, the secondary outlet 14 being blocked by valve spool 23.

When inlet pressure raises the fluid input pressure acting against the right hand end of valve spool 23 will provide a force exceeding that of the forces of the reduced pressure and spring 31 acting on the left hand end of valve spool 23. In this condition, valve spool 23 will be moved to the left as shown in FIGURE 1 as a result of differential pressure, allowing excess flow to be directed through secondary outlet passage 14 to the auxiliary fluid operated equipment. In a preferred form of the invention, this movement takes place in accordance with the pressure buildup in the system in order to provide a constant flow rate at outlet passage 13 to the primary system. Control is further assured by means of valve 48, which moves under the influence of excess pressure in chamber 19 to allow bypass through passages 36, 38, the interior of cylindrical element 40, passages 46, 47, and 44 through fitting 45 to reservoir.

A pressure surge or other sudden increase of pressure at the inlet passage 12 would be expected to move valve spool 23 to the left in a jerky and erratic fashion. Were land 24 to block communication between chamber 19 and primary outlet passage 13, the controlled flow through outlet 13 would be disturbed. Accordingly, the provision of flat portions 28 on the surface of valve land 24 assures that even under excessive pressures a predetermined amount of fluid will flow from chamber 19 through the flattened areas defined by flats 28 to primary outlet passage 13. Thus, shock pressures will not block the flow of fluid to the primary circuit nor will flow be interrupted or delayed.

Turning now to FIGURE 2, it will be seen that a modified version of the flow divider includes the flow passage 36a communicating directly with primary outlet passage 13 rather than with chamber 19a. Thus, the pressure responsive check valve 48 is directly responsive to pressures in the primary outlet passage 13 and offers close control of flow in this passage.

In the modification shown in FIGURE 3, the valve stop member 32 is eliminated and valve stem 23a is formed with an extension 23b, which abuts directly against plug 33a acting as a stop member. Extension 23b is formed with a piston portion 23c slidably received in valve bore 18. Piston element 23c is provided with one or more flow passages 23d and serves as a dashpot to dampen fluctuations in movement of valve stem 23 responsive to vibrations, flutter, or fluctuations of fluid pressure within the system. The valve spool 23a including the dashpot may, of course, be incorporated into either modification shown in FIGURE 1 or FIGURE 2.

Turning now to FIGURE 4, a modified flow divider valve is provided for cold weather starting. When the engine is started under cold weather conditions, valve dampening and flow resistance combine to cause a valve reaction which is too slow to relieve high pressure developed. Since the auxiliary device connected with secondary outlet passage 14 normally would be disengaged during the engine starting operation, this passage would communicate with reservoir. Thus flow from inlet passage 12 to secondary outlet passage 14 would relieve undesirable inlet pressure.

To this end, plug 33 is replaced by a threaded plug 33b having an annular extension 33c. Plug 33b is sealed against leakage by a suitable O-ring 34. Received within plug 33b is a threaded member 32a having an extension 32b slidable within extension 33c and suitably sealed against leakage by an O-ring 34a. Extension 32b terminates in an abutment 32c which serves as a stop for valve spool 23.

Outward threading of member 32a relative to plug 33b is limited by contact between abutment 32c and extension 33c, in which position valve spool 23 blocks flow from inlet passage 12 to secondary outlet passage 14 in the manner of the modification shown in FIGURE 1. Inward threading of member 32a relative to plug 33b forces valve plug 23 to the left, as shown in FIGURE 4, to a position in which fluid communication is established between passages 12 and 14, thereby relieving excessive pressure in passage 12.

Thus this is provided a flow divider which insures a closely controlled flow from an inlet to a primary outlet and which diverts flow in excess of a predetermined amount to a secondary outlet, but which automatically blocks flow to the secondary outlet in the event that the rate drops below required amounts for the primary circuit. The pressure differentials and flow areas are designed to provide a relatively constant rate of flow in the primary outlet circuit.

Although a preferred form of the invention has been shown and described herein, it is to be understood that rearrangements of elements and modifications in structural detail may be effected without departing from the scope or spirit of the invention as defined by the following claims.

We claim:

1. A flow divider valve comprising a valve body having a bore therein, an inlet communicating with said bore adjacent one end thereof, a primary outlet communicating with said bore adjacent the other end thereof, a secondary outlet communicating with said bore intermediate said inlet and primary outlet, said inlet communicating through an orifice with said bore intermediate said primary and secondary outlets, a valve spool movable in said bore and having first and second land portions and a stem portion, said valve spool having a first limit of movement wherein said first land portion blocks communication between said inlet and said secondary outlet and unblocks communication between said inlet and said primary outlet around said stem portion, said valve spool having a second limit of movement wherein said first land portion unblocks communication between said inlet and said secondary outlet and blocks communication between said inlet and said primary outlet, said first land portion having at least one flat portion on the surface thereof communicating said inlet with said primary outlet around said stem portion when said valve spool is in its second limit of movement, said second land portion blocking communication between said primary outlet and the other end of said bore, said valve spool having passage means therein communicating said inlet with said other end of said bore, and a spring in said bore biasing said valve spool toward its first limit of movement.

2. The invention according to claim 1, said flow divider including a pressure relief valve communicating with said bore.

3. The invention according to claim 1, said flow divider including a pressure relief valve communicating with said primary outlet.

4. The invention according to claim 1, said valve spool having associated dashpot means for dampening movement thereof, 5. The invention according to claim 1, said valve having means for independently establishing fluid communication between said inlet and said secondary outlet independently of said differential pressure.

6. The invention according to claim 1, said valve having means for independently moving said valve spool to said second limit of movement.

References Cited by the Examiner

UNITED STATES PATENTS

| | | | |
|---|---|---|---|
| 1,148,568 | 8/15 | Bees | 137—495 X |
| 1,461,662 | 7/23 | Kawamura | 137—495 X |
| 2,310,636 | 2/43 | Howard | 137—513.5 |
| 2,859,762 | 11/58 | Banker | 137—101 |
| 2,995,141 | 8/61 | Hipp | 137—101 |
| 3,024,798 | 3/62 | Banker | 137—101 |
| 3,033,221 | 5/62 | Strader | 137—101 |

WILLIAM F. O'DEA, *Primary Examiner.*

ISADOR WEIL, *Examiner.*